Patented Jan. 26, 1954

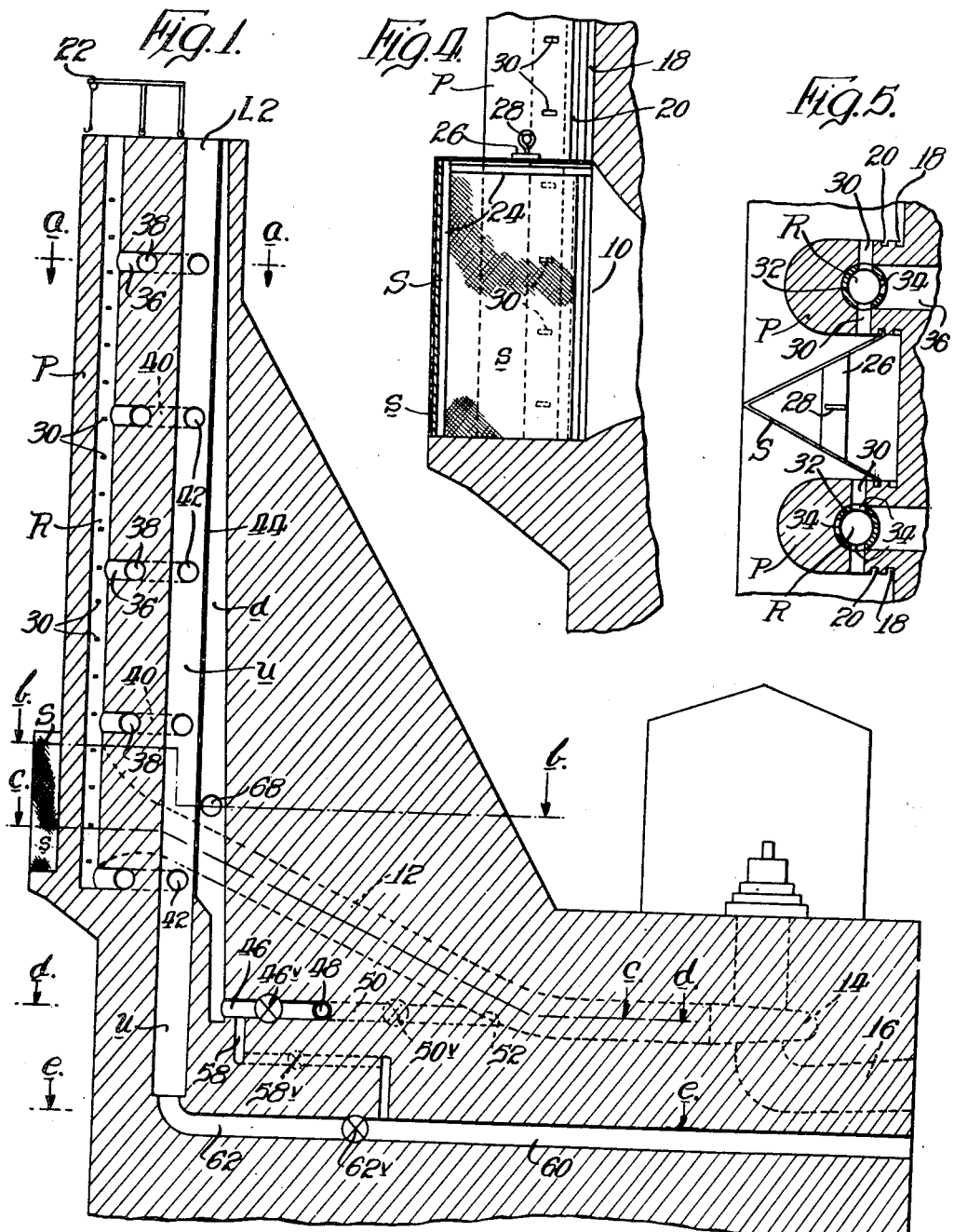

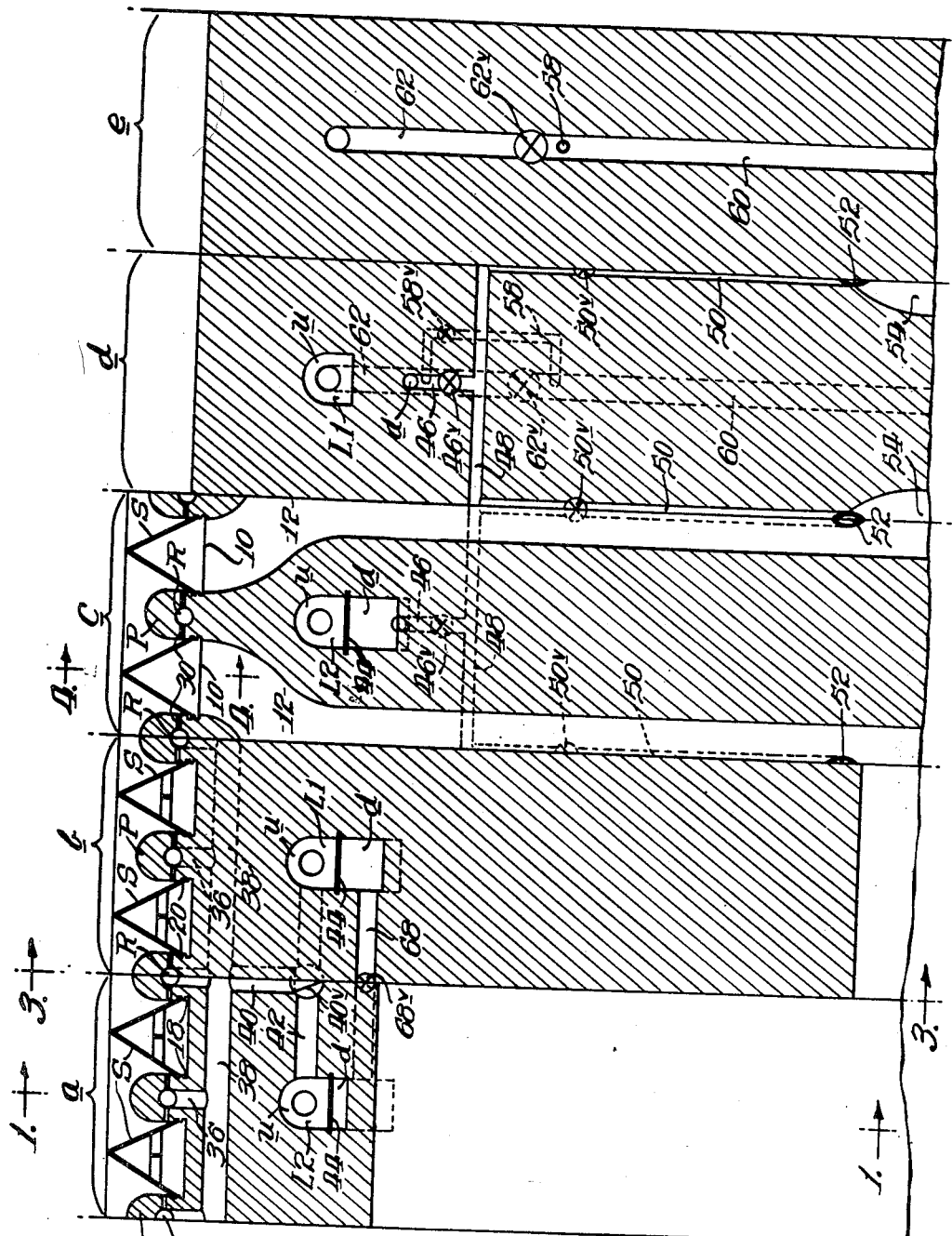

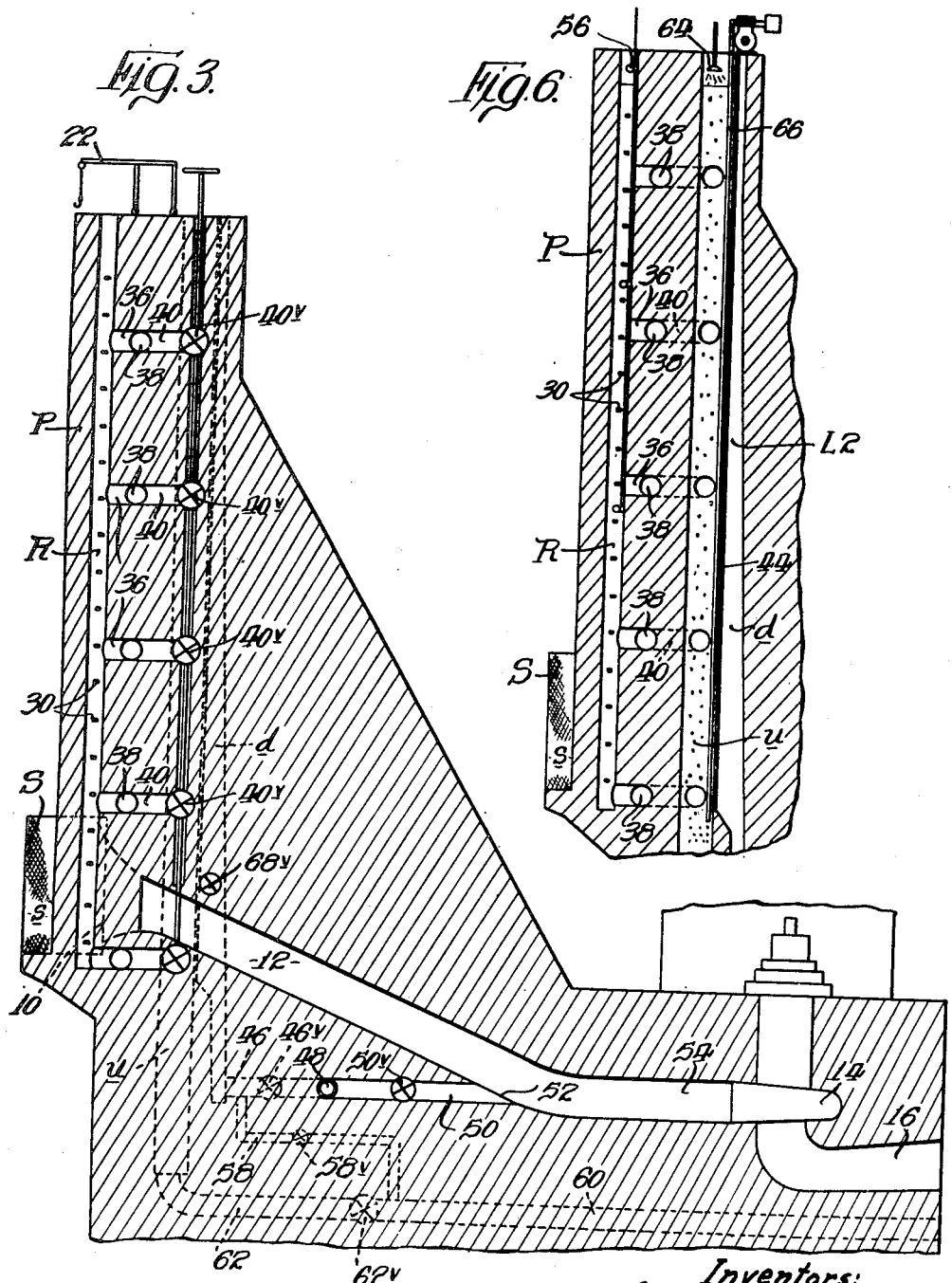

2,667,036

UNITED STATES PATENT OFFICE 2,667,036

FISH LOCK FOR DOWNSTREAM MIGRATION OF FINGERLINGS

Calvin V. Davis, La Grange, and Le Roy F. Harza, Highland Park, Ill., and J. Frank Ward, Tacoma, Wash.

Application December 7, 1950, Serial No. 199,708

6 Claims. (Cl. 61—21)

This invention relates to a locking system which may be incorporated into a power dam to provide a safe and certain means for fingerlings bound downstream to pass through the dam without interference or hazard. A locking system of this character has special utility with power dams across large streams wherein fish are accustomed to migrate downstream to the ocean and, in the course of their life cycle, to return upstream again to their original spawning place where their lives are ended.

In the Pacific Northwest States of this country the fishing industry has become an important part of the economy. The salmon, in particular, constitute a very valuable catch. These fish are accustomed to migrate down the great rivers where the power interests have constructed numerous dams, and have plans for others to follow. Opposition has attended the proposed construction of each such new power dam on the assumption that it must necessarily be inimical to the interests of the fishing industry. Such a tenet, however, is not necessarily true, provided only that a satisfactory way be found to permit the fish to migrate up and down the river as freely as before.

It is a habit of salmon fish to go upstream to spawn to the same place, often hundreds of miles from the ocean, where they were hatched from the eggs some three or four years before; when the young fish, known as fingerlings, are a few months old, they start back to the ocean where they live to and through maturity up to the time they are ready to return to their birthplace to propagate. The upstream migration of the mature fish is at present accomplished without undue loss through the contruction of fish ladders, elevators and fish locks, etc. Devices such as these have succeeded in their purpose, when properly designed, so the problem of removing barriers to upstream migration of fish has practically been solved at the present time.

The downbound fingerling problem, however, has proven more serious. Particularly is this so where dams of great height are encountered. The reason is the fingerlings will follow the flowing water, and during much of the year the only flow is through the turbines. The fingerlings in some cases may pass through the turbines with only a small loss, perhaps ten per cent, but as the fall or head which drives a turbine becomes greater, so does the danger to the fingerlings. In approaching the turbines in any power plant, the water pressure increases until, upon passing through the rotating turbine "runner," it suddenly reverses from pressure to partial vacuum. If the change of pressure is too great, as for higher heads, the fingerlings are stunned; some temporarily turn bottom-up, but later revive; some may also burst.

It is important that the downbound fingerlings be kept out of the turbines. For much of the year, however, the turbines furnish the only outflow, and consequently the intakes thereto are the only openings available to the fingerlings. To meet this condition, other means of outflow must be provided to divert the fingerlings away from the turbines, and prevent them from getting thereinto.

A screen whose mesh is fine enough to exclude fingerlings, if placed ahead of the turbine intakes, is no solution of the problem, because the normal intake velocity is such that the small fish will slap up against such a screen, be unable to retreat therefrom, and the screen will soon become clogged with dead or dying fish. However, a velocity through the screen of no greater than one foot per second will not suffice to hold the fish. They can still flap loose and swim free. It is necessary, however, that provision be made for the fingerlings to go somewhere else, rather than just back into the screen again. For this purpose we provide a row of specially formed screen units which together present a VVV front.

The velocity of the flowing water is then not straight, but obliquely through the screens, so that the fingerlings in trying to get through are swept along the screen surfaces to the bases of the V's where lateral inlet slots are provided in the concrete dam structure. A constant outflow of water through these slots will lead the fish first into a system of receiving chambers and then into certain locking chambers which permit the fish to be lowered to a point below the dam without any sudden change of pressure such as is encountered when passing through a turbine. Many inlet slots leading initially to the same receiving chamber may be provided, all arranged on the face of the dam structure, not only near the turbine intakes but elsewhere so as to attract a large proportion of the fingerlings away from the turbine screens.

The water flowing out of these many inlets is not wasted. It is passed through a large screen at a velocity of not greater than one foot per second, and probably at a very much lesser speed. Any such velocity is insufficient to hold the fish against the screen, so that the water is free to flow on back into the turbine penstocks. Only the volume of water in the lock chambers, after gathering a large population of fingerlings, will be lowered to the base of the dam and wasted without going through the turbines. The circulation of water which gathers the fish into the lock chambers will be induced by taking advantage of the velocity head and other pressure losses through the turbine intakes. In such a locking system the fingerlings advance first horizontally, then downwardly, and then horizontally again, to by-pass the turbine penstocks while passing through the dam structure. The small fish are thereby safeguarded while getting past each dam in their downstream migration.

In the accompanying drawings we have illustrated schematically a practical embodiment of this invention in the manner following:

Figure 1 is a vertical section through a dam structure, taken on line 1—1 of Fig. 2;

Fig. 2 is a fragmentary stepped section horizontally through the dam, showing areas thereof designated a, b, c, d and e at the levels which are similarly marked in Fig. 1;

Fig. 3, which is a view similar to that of Fig. 1, is a vertical section taken on line 3—3 of Fig. 2;

Fig. 4 is a detail in section, taken on line 4—4 of Fig. 2;

Fig. 5 is an enlarged detail in horizontal section showing the pier wells to be lined with rotatable sleeves which function as valves therefor; and Fig. 6 which is a view similar to Fig. 1 reveals the installation of certain special equipment not elsewhere shown.

The dam structure, so far as is illustrated in Figs. 1, 2 and 3, is constituted with a row of spaced vertical piers P upon its upstream side, and therebetween near its base are disposed the mouths 10 of the intakes 12 leading to the turbines 14 beyond which are the usual draft tubes 16 leading to tailwater. Each pier is provided near its base with a pair of vertical grooves 18 and 20, opposite other like grooves in the adjacent piers. Operating gates (not shown) are slidably fitted into one pair of opposed grooves 18 between adjacent piers P, and an extra gate or stoplog (not shown) for emergency use may be slidably fitted in the other pair of such grooves 20 between each two adjacent piers. We propose to utilize each outer pair of stoplog grooves 20 to accommodate also a screen unit S which may be lowered into place over the associated turbine intake mouth 10 (see Fig. 4) with the aid of a hoisting crane 22 that is mounted on the top of the dam. It will be understood, of course, that if there be need for use of a stoplog, the screen unit S is first hoisted up and out of the way to vacate the grooves 20 for accommodation thereof.

Each screen unit S comprises a rigid framework 24 on the front sides and top, the sides being converged at the front in the form of a V, as shown in Fig. 5. A cross brace 26 at the top may be fitted with an eye 28 to be engaged by the hook that is carried at the end of the hoisting cable of the crane. The framework 24 supports a meshed sheet s which extends over its sides and top, the meshes of the sheet being such as to exclude the fingerlings, without retarding unduly the flow of water therethrough for passage into the turbine intakes 12.

Such a screen unit is so disposed between two adjacent piers as to present its opposite sides in slanting relation thereto. Fingerlings which advance toward the screen unit will be drawn by the moving water along its diverging sides toward the adjacent piers. At this point we provide a number of small inlets in the form of slots 30, each leading laterally into the interior of the pier where we have provided a vertical receiving well R which extends for substantially its full height. Fish which move along with the flowing water toward the turbine intakes are diverted by the several screen units to enter the small inlet slots 30 near the base of the screen units, and pass into the vertical receiving well R one of which is provided interiorly of each pier. A rotatable sleeve 32 extending lengthwise of each receiving well is provided at points oppositely of the inlet slots with three ports 34 (see Fig. 5) spaced 90° apart with one unported area of nearly 180°. This constitutes a sleeve valve which may be operated to open the valve to the inlets on both sides of the pier, or to open a single valve port to the inlet on only one side of the pier. The installation of such a valve may be advantageous to control the inlet flow into the receiving well R, with particular reference to the operation or non-operation of the associated turbines.

The inlet slots 30, it will be noted, may be disposed at closely spaced elevations for substantially the full height of the piers at opposite sides thereof. Fingerlings swimming at various elevations, when drawn by the moving water close to the piers, will be guided by the screen units into these slots and thence into the receiving wells R where they tend constantly to accumulate in increasing numbers. The size of each inlet slot 30 should be such as to facilitate ready passage therethrough of a swimming fingerling, and about 2" or 3" high and 4"–6" wide will probably suffice.

Connecting pipes 36 lead rearwardly from each receiving well R to a plurality of horizontal lateral header pipes 38 (see Fig. 2) which are disposed at various elevations. These header pipes which are disposed rearwardly of the collecting wells R are in turn connected through admission pipes 40 to laterally extending manifold pipes 42 each of whose opposite ends communicates with one of two lock wells L1 and L2. A two-way valve 40v is provided at the juncture of each connecting pipe 40 and manifold pipe 42 to close communication to either one (but not both) of the two lock wells L1 or L2, as desired. The locking system of this invention may include a large number of lock wells L1 and L2, but always arranged in groups of two or some multiple thereof.

After passing through the inlet slots 30 into one of the receiving wells R, the fingerlings will then travel vertically to one of the connecting pipes 36 and thence into the lateral header pipes 38 communicating therewith. Since there is a constant flow of water through such a circuit, the fingerlings need only drift along to be carried into the lateral header pipes 38 and thence through the pipes 40 and into the lateral manifold pipes 42 to enter one of the two lock wells L1 or L2, depending upon the position of the two-way valve 40v at the moment.

Each fish lock well L1 (or L2) is divided into two chambers u and d by a long vertical screen 44. This screen, which is of a mesh too fine for the fingerlings to pass therethrough, is slidably held in supporting slots provided at opposite sides of the associated well. The downstream chamber d of each well is shown as rectangular in cross section, and as increasing in width and sectional area in a downward direction. The cross sectional contour of this chamber may optionally be duplicated if desired in the upstream chamber $u$ of the well. The downstream chamber $d$ connects at the bottom with a rearwardly extending pipe 46, equipped with a valve 46v, leading to a lateral header pipe 48 from which pipes 50 are extended rearwardly through valves 50v, to the point 52 of confluence with the scroll penstock 54 associated with any one or all of the turbines which are being operated at the moment. Each valve 50v will be open or closed only when the associated turbine is started or stopped, respectively.

The flow of water through the system of wells, valves and piping is induced by the difference in head between the static water pressure in the reservoir and the pressure in the flowing water at the confluence points 52 where the pipes 50 enter the scroll penstocks 54. This difference in pressure consists of the velocity head $v^2/2g$ plus any friction losses through screen units S, and gateways and penstocks. If the velocity in the penstock, for example, is 12 feet per second at the confluence point 52, the velocity head will be 144/64.3 or about 2.2 feet plus friction and other minor losses, perhaps 2.5 feet total.

If the water velocity into the inlet slots 30 is about 5.5 feet per second, the velocity head thus consumed is $5.5^2/64.3$ or about 0.5 foot, leaving about 2.0 feet for friction losses in these slots, receiving wells R, headers 38, pipes 40, valves 40v, lock well L1 (or L2), screens 44, header 48, and pipes 50 and connecting valves, bends, etc. The relative total cross sectional area of all inlet slots 30 must be so related to the cross sectional area and velocities required in the above piping system as to maintain the required ratio of velocity head in the inlet slots, to total friction and other losses in the entire system, as 0.5 is to 2.5. Thus in the instance above illustrated about 20 per cent of the total loss is permissible through the velocity head in the slots. The total number and size of the inlet slots must, of course, be properly balanced with the remainder of the system.

Since the instinct of the fingerlings is to follow flowing water wherever it may lead them, they will find themselves in the lock well L1 (or L2). They can go no farther because of the screen 44, and will accumulate in the well L1 (or L2) until any desired density of fish is reached. If it is found that fish are attracted by light, the water passages can all be illuminated by lights 56 (see Fig. 6), and especially the inlet slots 30 where the fish must be attracted to enter into the accumulator system. These lights may be positioned at the top (as shown) and/or at various elevations where the illumination is found to be most effective.

When fingerlings to a desired density have accumulated in the lock well L1, for example, the valve 40v will be quickly reversed to the position which will allow the flow to pass through into the well L2, instead of the well L1. At the same moment the outlet valve 46v will be opened for the well L2, and closed for the well L1; when so operated, the well L1 will be isolated so that no water can enter or leave it.

We provide also in connection with the pipe 46 a drain pipe 58, equipped with a valve 58v, which leads to the tailrace through a rearwardly extending waste pipe 60. This pipe includes also a section 62 in connection with the chamber $u$ of the lock well L1 (or L2) at its bottom, and is provided with a valve 62v which is normally closed to prevent escape of the water and fingerlings therefrom. At the leisure of the operator, or by automatic control, the valve 58v may be opened to permit the water in the lock well L1 to slowly drain out and waste into the tailrace through the pipes 58 and 60. As soon as the water level in this well has dropped to a reasonable height above tailwater, perhaps ten feet above so that no injurious velocity can be created, the valve 62v may be suddenly opened and the valve 58v closed, thereby to rapidly flush out the remaining water and all of the fingerlings which have accumulated in the well L1 for eduction through the waste pipe 60 to tailwater. The waste pipe is shown diagrammatically below the draft tube 16, but in practice it would actually be just above tailwater level so that the escaping fingerlings could be seen and, if desired, be counted as well.

It will be noted that as the water is lowered from headwater downwardly in the well L1 no fish will be left behind. The walls of both lock wells are all vertical, including the large area of each screen 44, so that there are no places for fish to hang up. As the water approaches the bottom and the submerged screen area is greatly reduced, if the velocity through the screen should exceed one foot per second and any fish become lodged at that point, they will immediately fall free from the screen into the water again when the water surface lowers beneath them. Moreover, the pipe 58 and valve 58v through which the lock well L1 (or L2) is drained can be made small enough so that the velocity through the screen 44 will not exceed one foot per second at the lowest level of water in the well just at the moment of instantaneous opening of the valve 62v and closing of the valve 58v.

During the time required for accumulation of fingerlings in the well L1 (or L2), which may be a variable period, a spray 64 can be made to play on its top surface, or an air pipe 66 can discharge below the water surface to keep the water aerated and fresh (see Fig. 6). If algae or other material gradually accumulates on the screen 44, tending to clog it, the spray 64 can be played on it while the water is lowering, thus tending to clean it, or a man, while the well is empty, can go down on a boatswain chair and clean it. As will appear later, the flow through the screen 44 will be reversed during filling, and this also tends to clean the screen. The screen, preferably of sectional construction, can be removed and repaired at will.

After flushing the fish from the well L1 into the tailwater, a valve 68v will be opened to permit free communication through a cross pipe 68 that extends between the downstream chambers $d$ of two adjacent lock wells L1 and L2 at relatively low points. Water is then free to flow from the well L2 through the cross pipe 68 to refill the well L1. For a few moments the valve 62v from the well L1 will be left open, if experience should prove this to be necessary, so that an outward flow to the tailrace in the waste pipe 60 will be maintained for an interval to direct any residual fish in this pipe to the tailwater. The valve 62v will then be closed. It will be noted that the flow through the screen 44 will be reversed when filling the well L1, thus helping to wash it. While the well L1 is being refilled in this manner, the flow entering into the slots 30 and through the piping system may be accelerated, or the flow may be held down to approximately normal, depending upon the size of the cross pipe 68, in which case the water would temporarily be used to refill the well L1 while flowing at a reduced rate, if at all, into the penstock at the confluence point 52. As soon as the lock well L1 is refilled, the process is ready for repeating by releasing the fish which have accumulated in the lock well L2.

It is important to note that the fingerlings are locked down to tailwater level with practically no change of the pressure to which they are subjected. When they first enter the inlet slots 39 at any elevation along the face of the dam, the fingerlings are subjected to a change in pressure only as required to ascend or descend to the nearest pipe 36 leading to the proximate header pipe 36. This is a very small change. After reaching such a header, the fish travel on a level route to whichever lock well L1 or L2 is then open for admission, and there they are at liberty to choose their own depth of water. The lock wells L1 and L2 are alternately drained slowly with no injurious change of pressure. When the valve 62v is suddenly opened to flush the fingerlings into tailwater, the water surface in the affected well then will almost have reached tailwater level, and the pressure change will be small. In fact, it would be quite possible, although not necessary, to permit the water level in the lock well L1 to drain down to tailwater level before opening the valve 62v, instead of suddenly flushing, and to then create the outflow from the pipe 60 only by the inflow from the well L2 through the valve 68v for a few minutes before refilling the well L1.

The whole operation is manifestly under complete control at all times. The fish accumulator process wastes no water since it all goes back into the penstocks at the confluence points 52 to be used by the turbines. The only water wasted is that involved in emptying the lock wells L1 or L2 at intervals which might be once in several hours, or even days at some seasons of the year when few fingerlings are running. With the use of suitable apparatus, the entire process may be rendered automatic in its operation.

The various valves are shown schematically in the drawings. Actually, as in modern dam structures, they would all be caused to operate automatically and in proper sequence from a central control which might also be actuated by electric eyes in the walls of the lock wells L1 and L2, in response to the density of accumulated fingerlings.

We claim:

1. A cross-stream power dam wherein is combined a lock system for down-bound fingerlings comprising on the upstream face of the dam a plurality of forwardly extending vertical piers defining between them turbine intakes at low elevations, and provided at points closely adjacent the upstream face of the dam with oppositely facing guideways for retention of vertically slidable gates, each pier being formed to enclose a receiving well extending for a major portion of its height, a plurality of inlet slots in each pier, arranged one above another, and communicating with said well, with all said slots extending laterally to points upon the pier sides relatively close to the upstream face of the dam, a screen unit fitted to slide within a pair of oppositely facing guideways to a down position in covering relation to one of the turbine intakes, the screen unit comprising a meshed sheet carried by a rigid framework in the form of a V-section having two sides engaging adjacent piers at points downstream from the inlet slots and converging therefrom to a point relatively remote from the upstream face of the dam to deflect fingerlings advancing with the moving stream to the lateral faces of the adjacent piers for admission along with a portion of the moving stream into the inlet slots thereof and into the receiving wells in communication therewith, means for directing substantially all of the water admitted into the receiving wells into the turbines, a screen for preventing fingerlings from following the water so directed into the turbines, and a lock system in communication with the receiving wells having means for controlled lowering of the fingerling-laden water therefrom to tailwater.

2. A cross-stream power dam having a plurality of turbine penstocks extending from its upstream face to tailwater and having adjacent each penstock intake on the upstream face of the dam a pair of forwardly extending piers, a receiving well within each pier extending for a major portion of the height thereof, a plurality of inlet slots in each pier, arranged one above another, and communicating with said well, with all said slots extending laterally to points upon the pier sides relatively close to the upstream face of the dam, a screen unit positioned in covering relation to the mouth of each turbine intake and disposed obliquely to the upstream face of the dam to deflect fingerlings advancing with the moving stream to the lateral faces of the adjacent piers for admission along with a portion of the moving stream into the inlet slots thereof and into the receiving wells in communication therewith, means for directing substantially all of the water admitted into the receiving wells into the turbines, a screen for preventing fingerlings from following the water so directed into the turbines, and a lock system in communication with the receiving wells having means for controlled lowering of the fingerling-laden water therefrom to tailwater.

3. A cross-stream power dam wherein is combined a lock system for down-bound fingerlings comprising a lock well formed in the dam having means for admitting a constant stream of fingerling-laden water thereinto, a screen extended vertically within the well for substantially its full height to define therewithin an upstream chamber and a downstream chamber, the means for the fingerling-laden water communicating solely with the upstream chamber in the lock well, there being also a turbine penstock extending within the dam from its upstream face and in communication with a turbine and a draft tube leading therefrom, a waste pipe below the upstream chamber of the well and in connection therewith and leading to tailwater, a pipe in connection with the bottom of the downstream chamber and leading to the penstock for connection therewith, independently operable controlling valves in each of said pipes, and a controlling valve in the means for admitting water-borne fingerlings into the well, the arrangement being such that the upstream chamber of the well may receive a stream of fingerling-laden water which passes as fingerling-free water into the downstream chamber and thence passes into the penstock for operation of the turbine and with fingerling-laden water by-passing the penstock through the waste pipe for delivery of the fingerlings into tailwater.

4. A cross-stream power dam wherein is combined a lock system for down-bound fingerlings comprising a lock well in the dam, a plurality of inlets on the upstream face of the dam communicating with the well to admit a constant stream of fingerling-laden water thereinto, a screen extended vertically within the well for substantially its full height to define therewithin an upstream chamber and a downstream chamber, the inlets communicating solely with the upstream chamber in the lock well, there being also a turbine penstock extending within the dam from its upstream face and in communication with a turbine and a draft tube leading therefrom, a waste pipe below the upstream chamber of the well and in connection therewith and leading to tailwater, a pipe in connection with the bottom of the downstream chamber and leading to the penstock for connection therewith, independently operable controlling valves for controlling each of said pipes, a controlling valve in the inlets, the arrangement being such that the flow of fingerling-laden water into the upstream chamber produces a flow of fingerling-free water into the downstream chamber to be passed into the penstock for operation of the turbine until fingerlings have accumulated in the upstream chamber whereupon the valve controlling the pipe connecting the downstream chamber to the penstock may be closed and the valve controlling the waste pipe may be opened for delivery of the fingerlings into tailwater 5. A cross-stream power dam wherein is combined a lock system for down-bound fingerlings comprising a penstock extending from the upstream face of the dam to a turbine and therebeyond to a draft tube extending to tailwater, a pair of lock wells in the dam, a screen extending vertically within each well for substantially its full height to define therewithin an upstream chamber and a downstream chamber, a valved waste pipe in connection with each upstream chamber and leading therefrom to tailwater, a valved pipe in connection with each downstream chamber and leading therefrom to the penstock to augment the volume of water passing therethrough for operation of the turbine, a pipe interconnecting the two lock wells, an admission pipe providing communication between the upstream face of the dam and the interconnecting pipe between the two wells, and a two-way valve at the junction of the two pipes last named for establishing communication between the admission pipe and either lock well, as selected.

6. A cross-stream power dam wherein is combined a lock system for down-bound fingerlings comprising means providing a plurality of inlets on the upstream face of the dam, a turbine penstock within the dam leading to tailwater, a pair of lock wells in the dam, a screen extending vertically through each lock well for substantially the full height thereof to define upstream and downstream chambers therewithin, a connection between the inlets and the upstream chamber of each lock well, a valve in the said connection for selectively shutting off communication to either lock well while directing a stream of fingerling-laden water to the other lock well, a waste pipe leading to tailwater, a valved connection between the upstream chamber of each lock well and the waste pipe for periodically releasing fingerling-laden water therethrough, and a valved connection between the downstream chamber of each well and the penstock for passing a stream of fingerling-free water therethrough to augment the water flowing through the penstock for turbine operation.

CALVIN V. DAVIS.
      LE ROY F. HARZA.
      J. FRANK WARD.

References Cited in the file of this patent

UNITED STATES PATENTS

| Number | Name | Date |
|---|---|---|
| 2,119,540 | Holmes et al. | June 7, 1938 |
| 2,125,311 | Peterson | Aug. 2, 1938 |
| 2,169,249 | Holmes et al. | Aug. 15, 1939 |
| 2,171,560 | Holmes et al | Sept. 5, 1939 |
| 2,381,100 | Barr | Aug. 7, 1945 |

OTHER REFERENCES

Engineering News-Record, pages 235–237, Feb. 13, 1936.